(12) United States Patent
Teller et al.

(10) Patent No.: US 10,779,683 B1
(45) Date of Patent: Sep. 22, 2020

(54) GRINDING DEVICE

(71) Applicant: POTENT FUN CORP, Arcadia, CA (US)

(72) Inventors: Robert Ezra Teller, Arcadia, CA (US); Paul F. Myers, Cumberland (CA)

( * ) Notice: Subject to any disclaimer, the term of this patent is extended or adjusted under 35 U.S.C. 154(b) by 0 days.

(21) Appl. No.: 16/861,179

(22) Filed: Apr. 28, 2020

(51) Int. Cl.
 *A47J 42/14* (2006.01)
 *B26B 27/00* (2006.01)
 *A24B 7/00* (2006.01)
 *A24F 23/04* (2006.01)

(52) U.S. Cl.
 CPC ............... *A47J 42/14* (2013.01); *A24B 7/00* (2013.01); *A24F 23/04* (2013.01); *B26B 27/00* (2013.01)

(58) Field of Classification Search
 CPC ............ A47J 42/14; A24B 7/00; B26B 27/00
 USPC .............................................. 241/168–169.1
 See application file for complete search history.

(56) References Cited

U.S. PATENT DOCUMENTS

| | | | | |
|---|---|---|---|---|
| 795,746 | A * | 7/1905 | Wingfield | A24F 15/18 206/238 |
| 2,900,140 | A | 8/1959 | Schuhmann et al. | |
| 3,583,455 | A * | 6/1971 | Ostrowsky | A47J 43/25 241/95 |
| D424,381 | S * | 5/2000 | Terenzio | D7/667 |
| D438,763 | S * | 3/2001 | Hood | D7/678 |
| D474,378 | S * | 5/2003 | Brandenburg | D7/679 |
| 6,637,684 | B1 * | 10/2003 | Ross | A47J 42/14 241/169.1 |
| D510,509 | S * | 10/2005 | Graves | D7/678 |
| 7,367,519 | B2 * | 5/2008 | de Groote | A47J 19/04 241/169.1 |
| 7,422,170 | B2 * | 9/2008 | Bao | B02C 18/24 241/168 |
| 7,886,999 | B2 * | 2/2011 | Ruzycky | A47J 42/24 241/168 |
| D668,919 | S * | 10/2012 | Teng | D7/693 |
| D669,747 | S | 10/2012 | Scharf et al. | |
| 8,393,563 | B2 * | 3/2013 | Chaoui | B02C 18/08 241/168 |
| 8,720,807 | B2 * | 5/2014 | Priebe | A61J 7/0007 241/169 |
| 8,733,679 | B2 * | 5/2014 | Camitta | B02C 18/16 241/169.1 |
| D714,595 | S | 10/2014 | Ducey | |
| D726,367 | S | 4/2015 | Dukat | |
| 9,010,669 | B2 * | 4/2015 | Priebe | B02C 19/08 241/169 |
| 9,241,597 | B2 | 1/2016 | Dukat | |

(Continued)

*Primary Examiner* — Faye Francis
(74) *Attorney, Agent, or Firm* — Tsz Lung Yeoung

(57) ABSTRACT

A grinding device includes a storage base having a storage cavity, a grating member having a plurality of passage holes, a grinding handle having an actuating portion and a grinding cavity, at least one grinding member provided in the grinding cavity. The grinding member includes a protruding body protruding in the grinding cavity and extending in a radial direction of the grinding handle, and a plurality of grinding teeth provided on the protruding body. The grinding teeth extend in a transverse direction of the protruding body. When a predetermined amount of the food or herb items is disposed in the grinding cavity, and when the grinding handle is driven to rotate with respect to the storage base and the grating member, the grinding teeth are arranged to cut the food or herb items into fine pieces.

20 Claims, 8 Drawing Sheets

(56) References Cited

U.S. PATENT DOCUMENTS

| | | | |
|---|---|---|---|
| D755,022 S | 5/2016 | Dukat | |
| D755,584 S | 5/2016 | Dukat | |
| D759,438 S | 6/2016 | Dukat | |
| D761,064 S | 7/2016 | Dukat | |
| 9,392,908 B2 | 7/2016 | Edwards et al. | |
| 9,681,777 B1 | 6/2017 | Dukat | |
| 9,757,733 B1 | 9/2017 | Dukat | |
| 10,285,717 B2 * | 5/2019 | Anderson | A61B 17/22 |
| 10,349,780 B2 * | 7/2019 | Dukat | A47J 42/40 |
| 10,455,984 B1 * | 10/2019 | Abehasera | A47J 42/30 |
| 10,617,258 B2 * | 4/2020 | Moneta | A47J 42/14 |
| 2007/0262182 A1 * | 11/2007 | de Groote | A47J 19/04 |
| | | | 241/169.1 |
| 2009/0224088 A1 * | 9/2009 | Ruzycky | A47J 42/24 |
| | | | 241/169.1 |
| 2012/0153062 A1 | 6/2012 | Green et al. | |
| 2012/0286081 A1 * | 11/2012 | Delbridge | A47J 42/14 |
| | | | 241/169.1 |
| 2014/0138465 A1 * | 5/2014 | Yen | A47J 42/14 |
| | | | 241/69 |
| 2015/0144719 A1 * | 5/2015 | Wilson | A47J 42/22 |
| | | | 241/85 |
| 2017/0135524 A1 * | 5/2017 | Moneta | A47J 42/24 |
| 2017/0202396 A1 * | 7/2017 | Gumbel | A47J 42/12 |
| 2017/0245541 A1 * | 8/2017 | Pagan | A47J 42/34 |
| 2020/0187716 A1 * | 6/2020 | Ashton | A47J 42/36 |

\* cited by examiner

GRINDING DEVICE

BACKGROUND OF THE PRESENT INVENTION

Field of Invention

The present invention relates to a grinding device, and more particularly to a grinding device comprising a plurality of grinding members which is capable of grinding food or herb items and allowing more materials to be grinded in a more consistent manner and at the same time causing less jamming.

Description of Related Arts

A conventional grinder, such as a manual grinder for herbs or food items, usually comprises a handling member, a storage member and a guiding member provided between the handling member and the storage member. The handling member usually has an upper handling portion for a user to grip thereon, and a lower grinding portion rotatably coupled to the guiding member. The handling member usually comprises a plurality of grinding teeth provided on the lower grinding portion of the handling member and the guiding member, so that when the handling member rotates, the grinding teeth are driven to move with respect to each other for grinding herb or food items disposed in a space formed between the grinding teeth. The food or herb items will then be cut into very fine pieces and be guided to enter the storage member through a plurality of holes formed on the guiding member.

The above-mentioned conventional grinder has several disadvantages. First, when the herb or food items are being grinded by the grinding teeth, grinded and original herb or food pieces intermix with each other and rotation of the handling member with respect to the guiding member may cause frequent jamming of the grinder. Due to this problem, a user must not put too much herb or food items into the grinder because doing so would worsen the jamming problem described above, and this severely limit the efficiency of conventional grinders as food or herb items must be separately grinded in very small portions.

As a result, there is a need to develop a grinding device which is capable of allowing more materials to be grinded in a more consistent manner and at the same time causing less jamming.

SUMMARY OF THE PRESENT INVENTION

Certain variations of the present invention provide a grinding device comprising a plurality of grinding members which is capable of grinding food or herb items and allowing more materials to be grinded in a more consistent manner and at the same time causing less jamming.

Certain variations of the present invention provide a grinding device comprising a grating member which is designed and shaped to guide materials to move to a central portion of the grating member so as to allow more materials to be grinded and prevent jamming.

Certain variations of the present invention provide a grinding device comprising a grinding handle having two set of teeth for grinding food or herb items into very fine pieces.

In one aspect of the present invention, it provides a grinding device for food or herb items, comprising:

a storage base having a storage cavity;

a grating member detachably coupled to the storage base to detachably enclose the storage cavity, the grating member having a plurality of passage holes arranged in a predetermined array;

a grinding handle which is detachably and rotatably coupled to the grating member, and has an actuating portion and a grinding cavity, the grinding cavity being positioned to communicate with the storage cavity through the passage holes; and at least one grinding member which is provided in the grinding cavity, and comprises:

a protruding body protruding in the grinding cavity and extending in a radial direction of the grinding handle; and a plurality of grinding teeth provided on the protruding body, the grinding teeth extending in a transverse direction of the protruding body, wherein when a predetermined amount of the food or herb items is disposed in the grinding cavity, and the grinding handle is driven to rotate with respect to the grating member, the grinding teeth are arranged to cut the food or herb items into fine pieces, the fine pieces of food or herb items being guided to pass through the passage holes and collected in the storage cavity.

This summary presented above is provided merely to introduce certain concepts and not to identify any key or essential features of the claimed subject matter.

DETAILED DESCRIPTION OF THE PREFERRED EMBODIMENT

Figure 1:
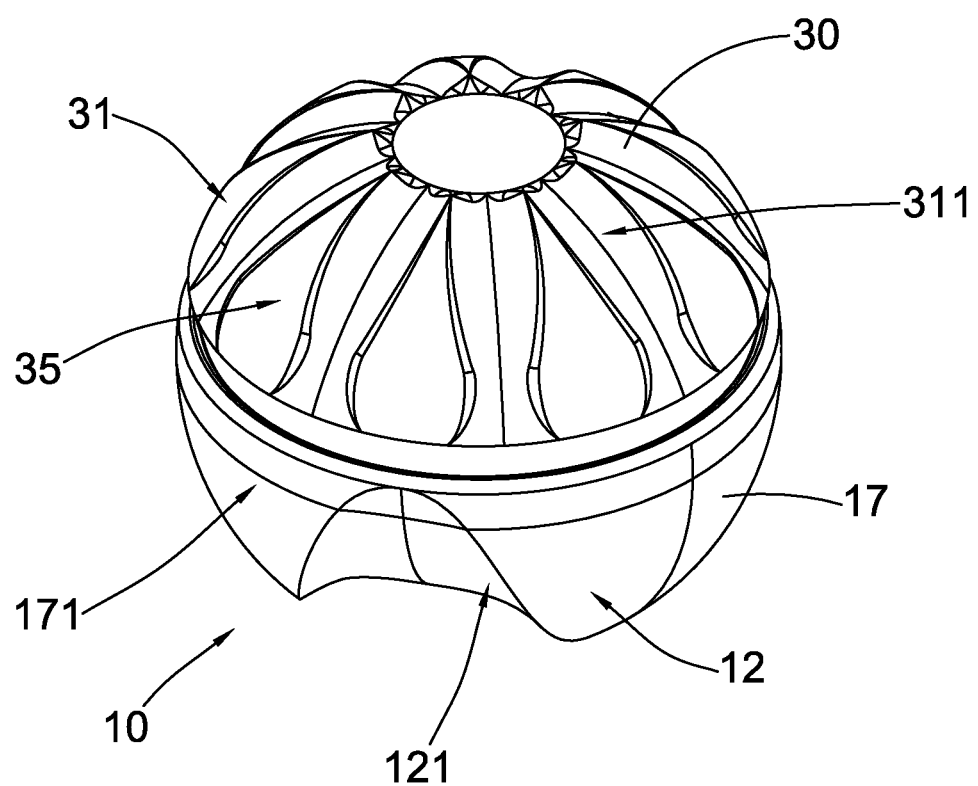
FIG. 1 is a top perspective view of a grinding device according to a preferred embodiment of the present invention.
Figure 2:
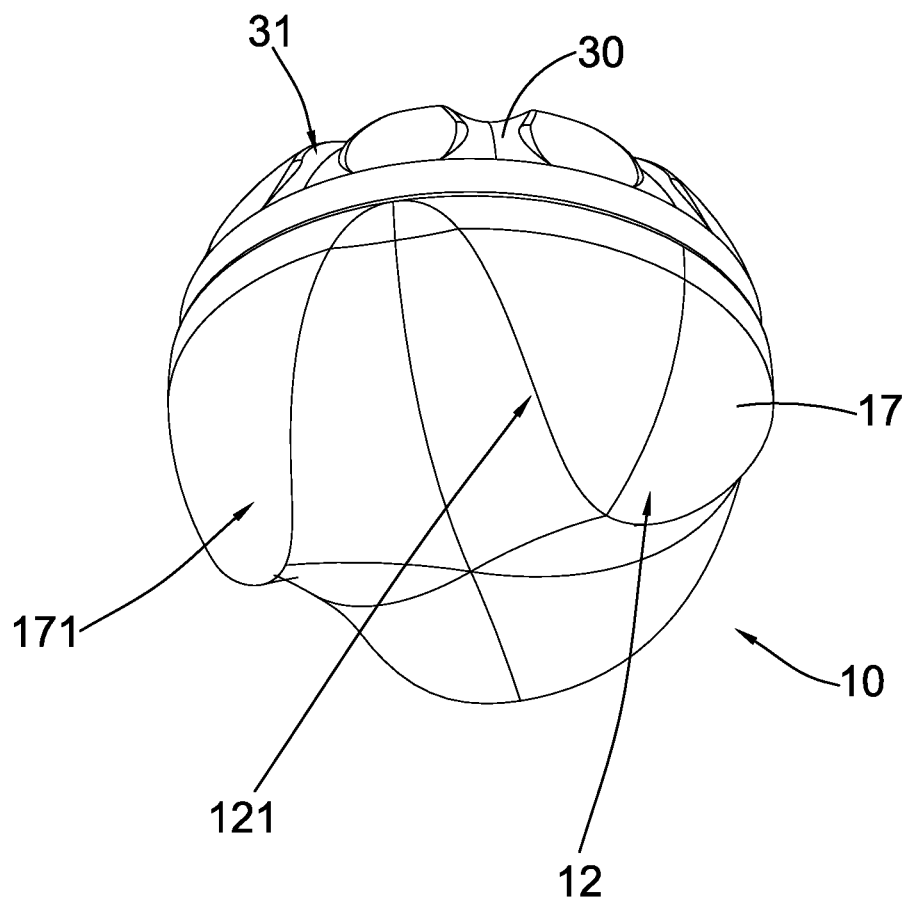
FIG. 2 is a bottom perspective view of a grinding device according to a preferred embodiment of the present invention.

The following detailed description of the preferred embodiment is the preferred mode of carrying out the invention. The description is not to be taken in any limiting sense. It is presented for the purpose of illustrating the general principles of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Furthermore, "connected"

may also mean direct connection or indirect connection, or connection through other auxiliary components. Therefore, the above terms should not be an actual connection limitation of the elements of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIG. 1 to FIG. 8 of the drawings, a grinding device according to a preferred embodiment of the present invention is illustrated. Broadly, the grinding device may comprise a storage base 10 having a storage cavity 11, a grating member 20, a grinding handle 30, and at least one grinding member 40. The grinding device may be for grinding or crushing a predetermined of food or herb items into very fine pieces.

The grating member 20 may be detachably coupled to the storage base 10 to selectively enclose the storage cavity 11. The grating member 20 may have a plurality of passage holes 21 arranged in a predetermined array.

The grinding handle 30 may be detachably and rotatably coupled to the grating member 20, and may have an actuating portion 31 and a grinding cavity 32. The grinding cavity 32 may be positioned to communicate with the storage cavity 11 through the passage holes 21.

The grinding member 40 may be provided in the grinding cavity 32, and may comprise a protruding body 41 and a plurality of grinding teeth 42. The protruding body 41 may protrude in the grinding cavity 32 and extend in a radial direction of the grinding handle 30.

On the other hand, the grinding teeth 42 may be provided on the protruding body 41. The grinding teeth 42 may extend in a transverse direction with respect to the protruding body 41, wherein when a predetermined amount of the food or herb items is disposed in the grinding cavity 32, and the grinding handle 30 is driven to rotate with respect to the grating member 20, the grinding teeth 42 may be arranged to cut the food or herb items into fine pieces, wherein the fine pieces of food or herb items may be guided to pass through the passage holes 21 and collected in the storage cavity 11.

According to the preferred embodiment of the present invention, the storage base 10 may be configured from glass material, such as tempered glass, so that the storage base 10 may be made transparent. Grinded food or herb items may be observed from outside the grinding device. As shown in FIG. 1 to FIG. 3 and FIG. 6 of the drawings, the storage base 10 may comprise a circumferential wall 17 having an outer surface 171 and an inner surface 172. The circumferential wall 17 may be formed to have a substantially semi-spherical structure and may have a substantially circular outer cross-sectional shape when viewed from the top. Moreover, the circumferential wall 17 may be shaped and sized to have a plurality of supporting legs 12 provided at a bottom portion of the storage base 10. The supporting legs 12 may help the grinding device to stand on a flat surface, such as on a table. Each of the supporting legs 12 may be defined by a curved ridge 121 formed on the outer surface 171 of the circumferential wall 17, wherein the curved ridge 121 may also be arranged to alter an optical characteristic of the circumferential wall 17.

Figure 7:
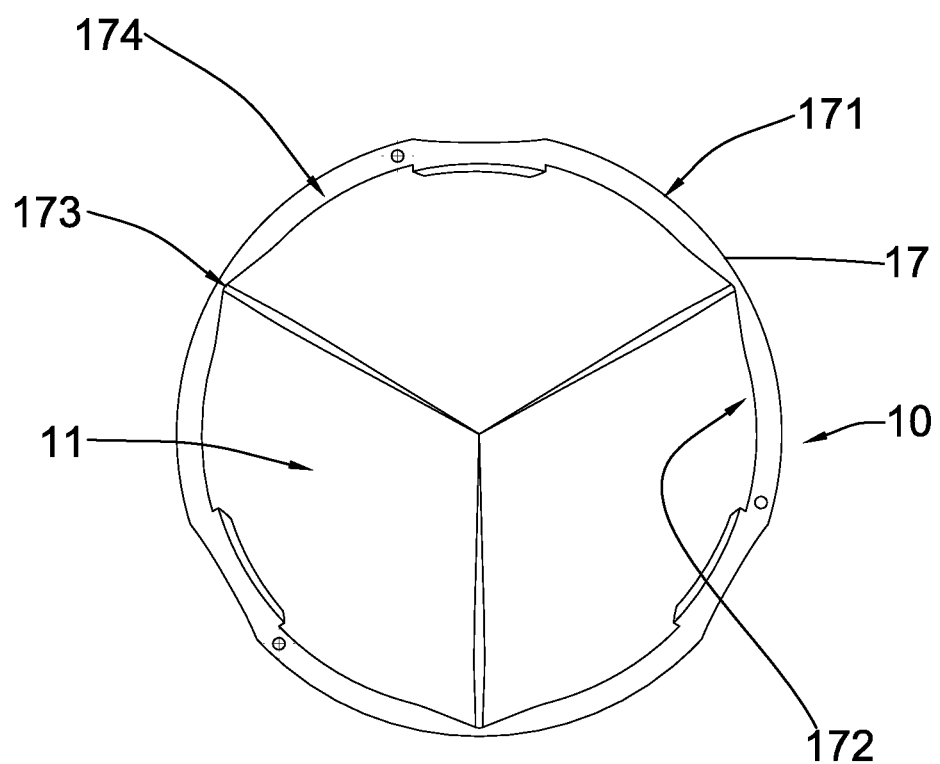
FIG. 7 is a top schematic diagram of the storage base of the grinding device according to the preferred embodiment of the present invention.
Figure 8:
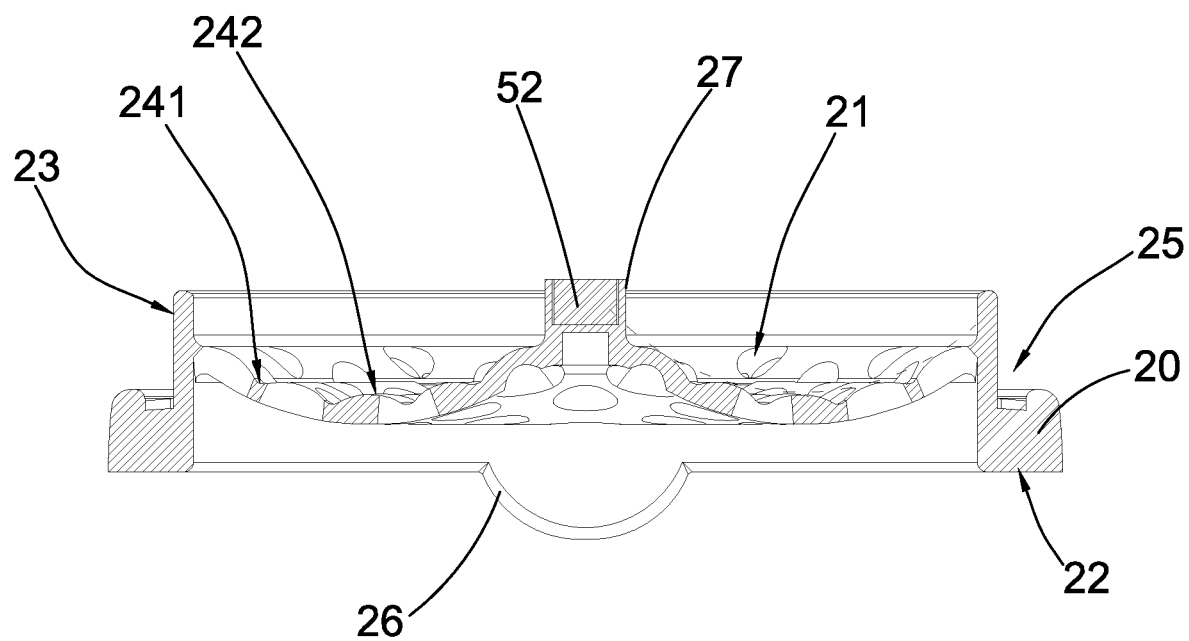
FIG. 8 is a sectional view of a grating member of the grinding device according to the preferred embodiment of the present invention.

As shown in FIG. 7 of the drawings, the circumferential wall 17 may further have a plurality of refraction ridges 173 formed on the inner surface 172 of the circumferential wall 17 to divide the inner surface 172 into a plurality of inner surface sections 174, wherein the inner surface sections 174 may join together to form a polygon cross sectional shape when viewed from the top. The refraction ridges 173 may be arranged to alter an optical characteristic of the circumferential wall 17 in such a manner that grinded materials stored in the storage cavity 11 may be optically magnified when observed from an exterior of the storage base 10.

The storage cavity 11 may be surrounded by an inner surface 172 of the storage base 10. The storage base 10 may further have a plurality of engaging members 13 inwardly protruded from the inner surface 172 for detachably engaging with the grating member 20 (described below). In this preferred embodiment, the engaging members 13 may be formed near a top circumferential edge 15 of the storage base 10 (i.e. the top edge of the circumferential wall 17).

The grating member 20 may be provided between the grinding handle 30 and the storage base 10. The grating member 20 may have an outer rim portion 22, a coupling portion 23 extended from the outer rim portion 22, and a grating platform 24 formed within the coupling portion 23, wherein the passage holes 21 may be formed on the grating platform 24. Specifically, the coupling portion 23 may be concentrically, inwardly, and upwardly extended from the outer rim portion 22 to form a connecting groove 25 as a clearance between the outer rim portion 22 and the coupling portion 23. The grinding handle 30 may be rotatably and detachably coupled to the connecting groove 25 for grinding the food or herb items in the grinding cavity 32 (described below in more details).

Figure 3:
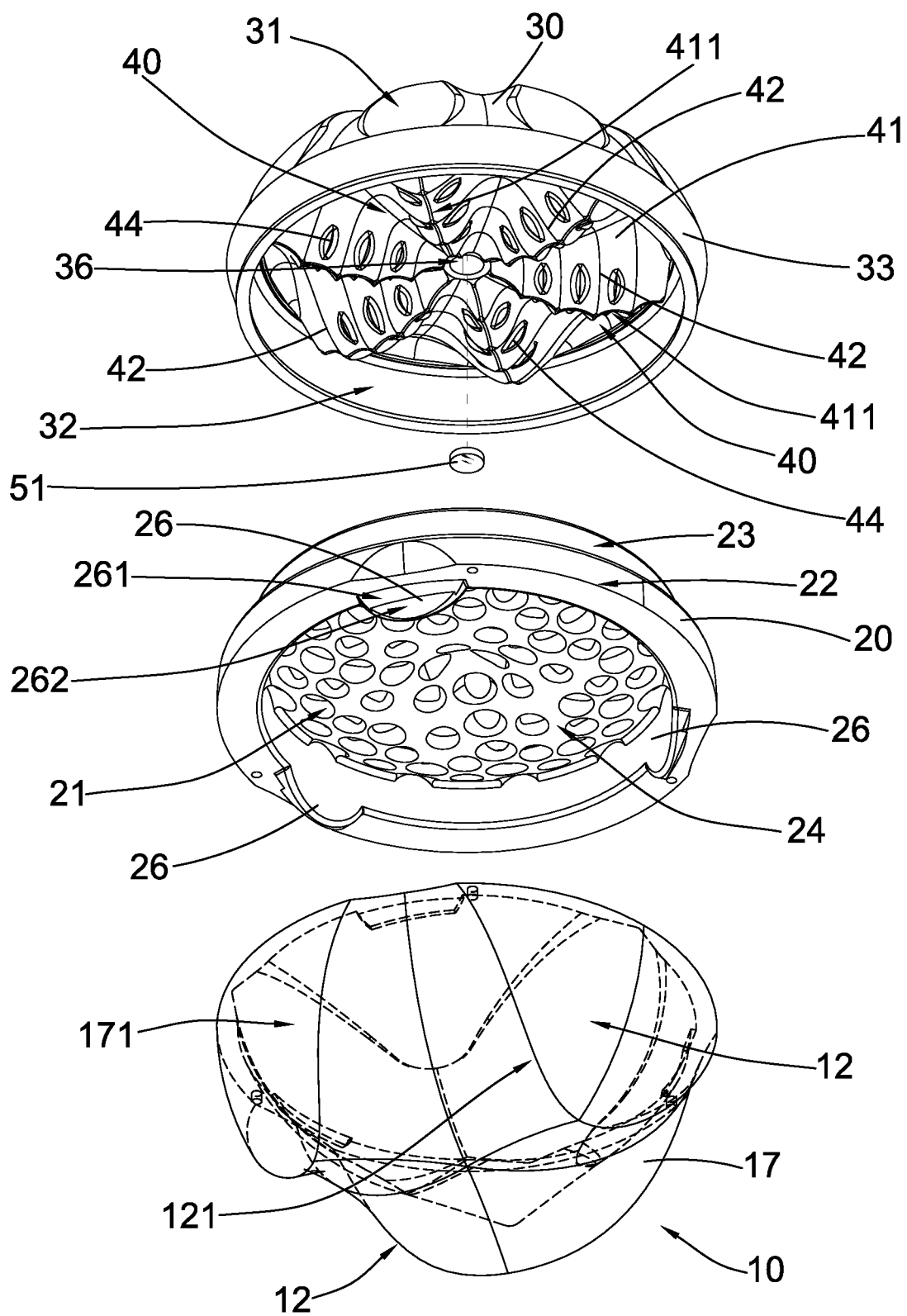
FIG. 3 is an exploded perspective view of the grinding device according to the preferred embodiment of the present invention.
Figure 4:
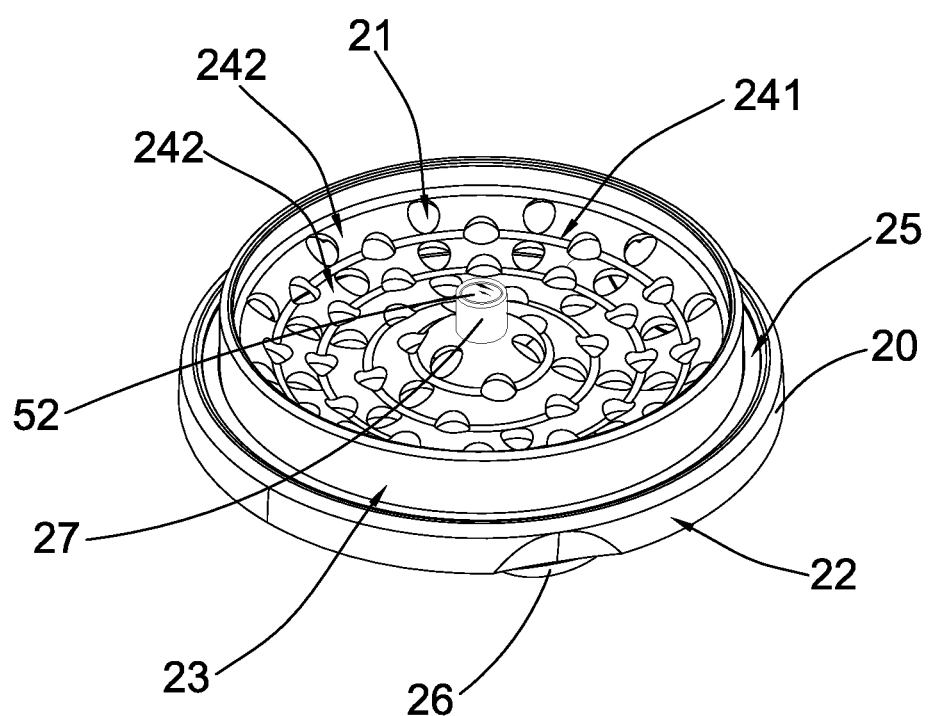
FIG. 4 is perspective view of a top side of a grating member of the grinding device according to the preferred embodiment of the present invention.

Furthermore, as shown in FIG. 3 and FIG. 4 of the drawings, the grating platform 24 may have a plurality of grinding grooves 241 formed thereon to divide the grating platform 24 into a corresponding number of grating sections 242, wherein each grinding groove 241 may be sandwiched between two adjacent grating sections 242. Each grating section 242 may have a slightly convex cross sectional shape when viewed from the side whereas each of the grinding grooves 241 is indently formed between two adjacent grating sections 242.

On the other hand, an imaginary line joining the highest point of each of the grating sections 242 may form a substantially concave cross sectional shape so that the grating platform 24 may form a downward slope from the coupling rim portion 23 and then an upwardly slope toward the center of the grating platform 24. This construction may be graphically illustrated in FIG. 8 of the drawings. The passage holes 21 may be formed on the grating platform 24 for allowing grinded materials to fall into the storage cavity 11 through the passage holes 21. When viewed as a whole, the grating platform 24 may have a cross sectional shape exhibiting a wavy contour.

It is worth mentioning that for the sake of easy manufacturing, the outer rim portion 22, the coupling portion 23 and the grating platform 24 may be formed as an integral structure. They are may also be separately formed and manufactured and coupled together to form the grating member 20. Moreover, the grating member 20 may be configured from or made of metallic material so as to provide better material strength and rigidity when food or herbs items are being grinded on the grating platform 24. Other materials are also possible and should be covered within the scope of the present invention.

The grating member 20 may further comprise a plurality of coupling members 26 extended from a bottom side of the outer rim portion 22 for detachably engaging with the engaging member 13 of the storage base 10. Specifically, each of the coupling members 26 may have a main extension portion 261 and an engaging portion 262 protruded from the main extension portion 261 for interlocking with the corresponding engaging member 13 of the storage base 10.

The grating member 20 may be detachably coupled to the storage base 10 in a rotatably movable manner and when the coupling members 26 are rotated such that they correspond to the engaging members 13 respectively, the engaging members 13 may block an upward movement of engaging portions 262 of the coupling members 26 so as to prevent the grating member 20 from detaching from the storage base 10.

On the other hand, the grinding handle 30 may be detachably and rotatably attached on the grating member 20 at the grinding groove 241 thereof. The actuating portion 31 of the grinding handle 30 may form a substantially semi-spherical structure wherein the grinding cavity 32 may be formed in this semi-spherical structure. Thus, the actuating portion 31 may have a curved outer surface 311 wherein the grinding cavity 32 may be circumferentially bounded by an enclosure wall 33. When the grinding handle 30 is attached on the grating member 20, the enclosure wall 33 is positioned at an outside of the coupling portion 23 of the grating member 20 and is partially received in the grinding groove 241.

The grinding handle 30 may further have a plurality of gripping grooves 35 indently formed on the curved outer surface 311 so that a user is able to palm on the grinding handle 30 with fingers gripping on the gripping grooves 35 for providing rotational power without clenching the user's fingers and causing excessive stress to the user's joint.

On the other hand, grinding device of the present invention may comprise at least one grinding member 40. In this preferred embodiment of the present invention, the grinding device may comprise a plurality of grinding members 40 received in the grinding cavity 32, wherein each of the grinding members 40 may comprise a protruding body 41 and a plurality of grinding teeth 42. As an exemplary embodiment which is illustrated in FIG. 3 of the drawings, the grinding device may comprise six grinding members 40 radially extended from a center portion 34 of the grinding cavity 32. Each of the grinding members 40 may be separated by a recess 43 formed in the grinding cavity 32.

Figure 5:
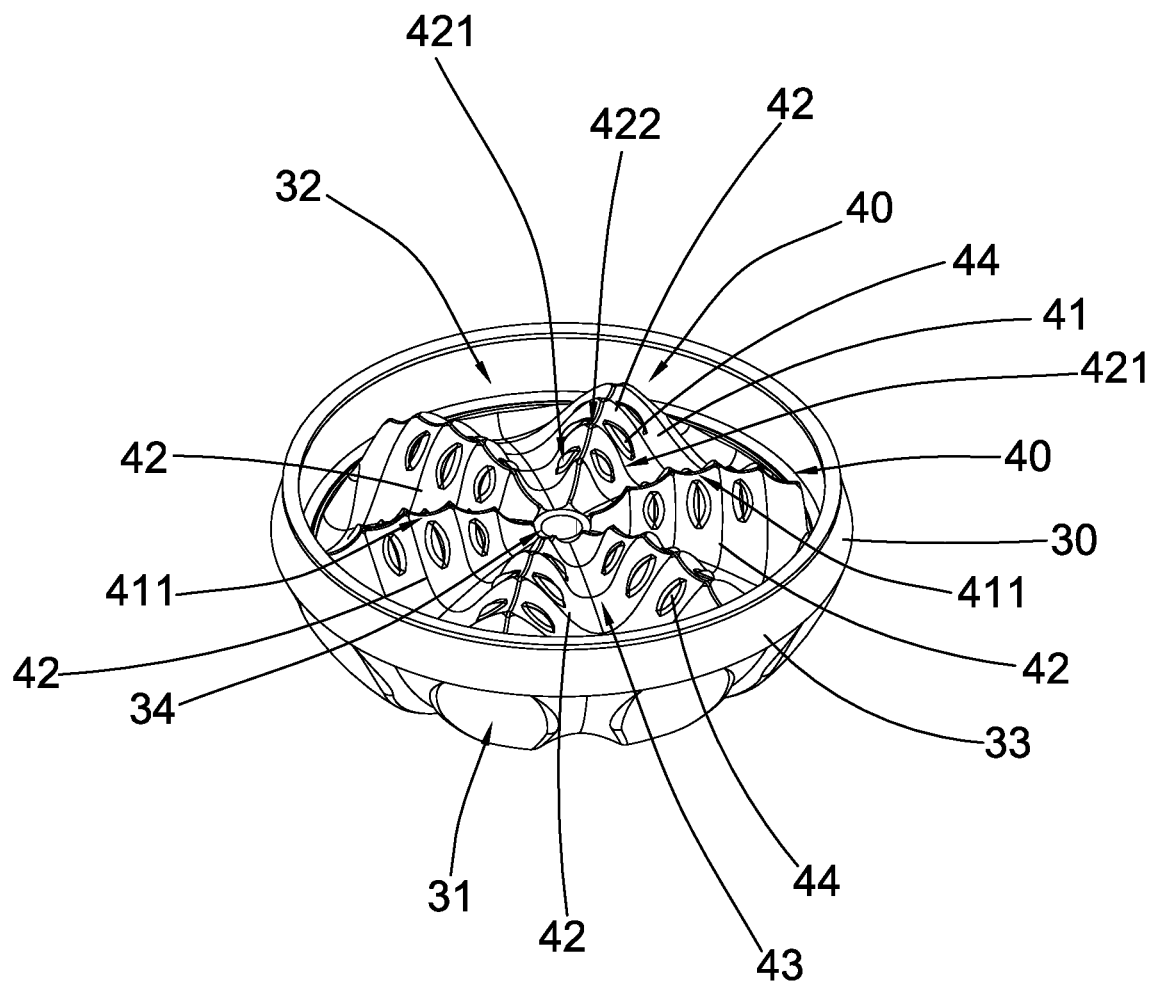
FIG. 5 is a perspective view of a bottom side of a grinding handle of the grinding device according to the preferred embodiment of the present invention.
Figure 6:
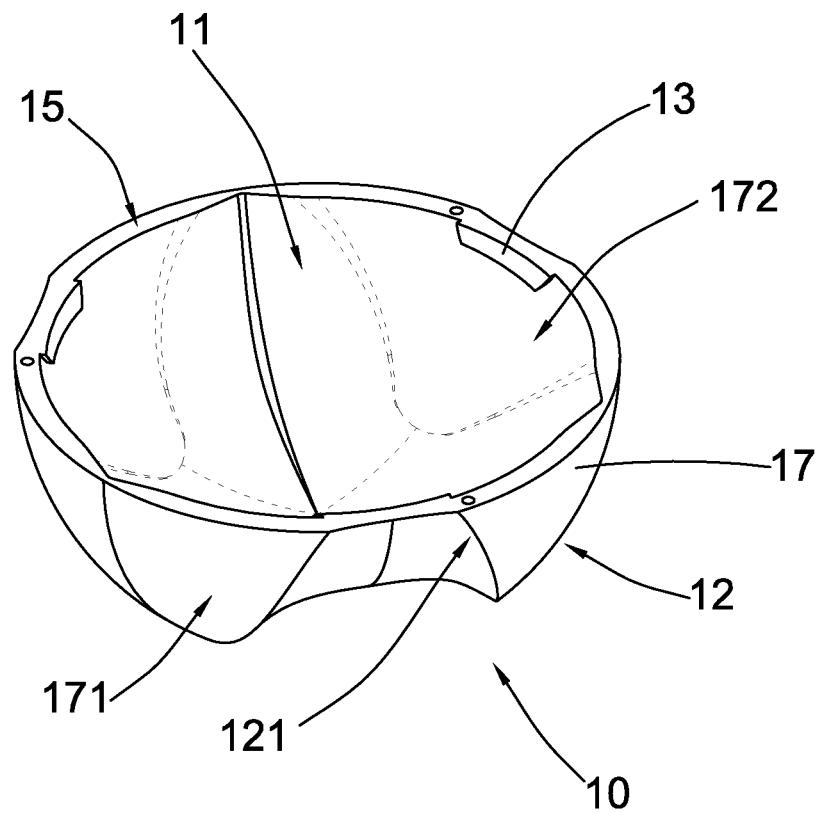
FIG. 6 is a top perspective view of a storage base of the grinding device according to the preferred embodiment of the present invention.

As shown in FIG. 3 and FIG. 5 of the drawings, each of the protruding bodies 41 may be downwardly protruded from the grinding handle 30 toward the grating member 20. Each of the protruding bodies 41 may have a curved contour in such a manner that when viewed from a bottom side of the grinding handle 30, a vertical thickness of each of the protruding bodies 41 may gradually decrease from a center portion 411 of the corresponding protruding body 41 toward the corresponding adjacent recesses 43. In other words, each of the protruding bodies 41 may have a convexly curved outer shape when viewed from the bottom side of the grinding handle 30. This may be illustrated in FIG. 3 and FIG. 5 of the drawings.

Moreover, the grinding teeth 42 may protrude from each of the protruding bodies 41. Each of the grinding teeth 42 may extend along an outer surface of the corresponding protruding body 41 and along a transverse direction thereof. Thus, each of the grinding teeth 42 may have a vertex portion 422 and two inclined portions 421 extended from the vertex portion 422 along two sides of the corresponding protruding body 41. The two inclined portions 421 may extend from the vertex portion 422 toward the two corresponding adjacent recesses 43. Note that the curved contour of the grinding members 41 may facilitate grinded food or herb items to fall to the adjacent recesses 43, therefore improving entropy of movement. This may also reduce the likelihood of static material that may exploit open tolerances of the present invention.

In this preferred embodiment, the grinding teeth 42 may be positioned to correspond to the grinding grooves 241 of the grating platform 24 so that when the grinding handle 30 is detachably and rotatably coupled on the grating member 20, the grinding teeth 42 may be received in the corresponding grinding grooves 241 respectively.

Each of the grinding members 40 may further have a plurality of crushing teeth 44 protruded from the corresponding protruding body 41 at positions between each two grinding teeth 42. The crushing teeth 44 may protrude from an external surface of the protruding body 41 between two corresponding adjacent grinding teeth 42. Accordingly, each of the crushing teeth 40 may be positioned on the corresponding grating section 242 of the grating platform 24 when the grinding handle 30 is detachably and rotatably coupled on the grating member 20.

Note that the interaction between the grinding teeth 42 and the grating platform 24 may help to expose cutting surfaces of the grinding teeth 42 and maximize a usable volume in the grinding cavity 32 so as to allow more food or herb items to be grinded. Moreover, the particular construction may also reduce downward pressure needed from a user because grinded material may be guided toward to center portion of the grating platform 24. This reduces the likelihood of material leakage from the sides of the grinding device.

The use of two set of teeth may serve different functions. The grinding teeth 42 may be arranged to cut initially deposited food or herb items down to a predetermined size. After that, the crushing teeth 44 may allow fine cutting of the materials (food or herb items) deposited in the grinding cavity 32. This arrangement may allow more materials to be cut, in a more consistent manner with less jamming.

The grinding device of the present invention may further comprise at least a first magnetic member 51 and a second magnetic member 52 provided on the grinding handle 30 and the grating member 20 respectively for providing magnetic attraction force between the grinding handle 30 and the grating member 20. In this preferred embodiment, the first magnetic member 51 may be mounted inside the grinding handle 30 so that it may be invisible from sight. As shown in FIG. 3 of the drawings, the grinding handle 30 may further have a securing slot 36 formed on a center portion of a bottom side of the grinding handle 30, wherein the first magnetic member 51 may be accommodated in the securing slot 36. This construction prevents the first magnetic member 51 from interfering with the grinding operation of the present invention while at the same time provide magnetic attraction force between the grinding handle 30 and the grating member 20.

On the other hand, the grating member 20 may further comprise an accommodating housing 27 extended from the grating platform 24 wherein the second magnetic member 52 may be accommodated in the accommodating housing 27. The accommodating housing 27 may be positioned corresponding to the securing slot 36 so that when the grinding handle 30 is detachably and rotatably coupled on the grating member 20, the accommodating housing 27 may be partially received in the securing slot 36 so as to allow magnetic attraction between the first magnetic member 51 and the second magnetic member 52. This coupling mechanism between the accommodating housing 27 and the securing slot 36 may help to stabilize the rotational movement of the grinding handle 30 with respect to the grating member 20.

At least one of the first magnetic member 51 and the second magnetic member 52 may be embodied as a magnet while the remaining first or second magnetic member 51 (52) may be embodied as iron. Alternatively, both of the first magnetic member 51 and the second magnetic member 52 may be embodied as magnets having different magnetic polarity.

The operation of the present invention is as follows: a user may first detach the grinding handle 30 from the grating member 20 and put a predetermined amount of food or herb items on the grating member 20. After that, the user may attach the grinding handle 30 back to the grating member 20 and grip on the actuating portion 31 so that the food or herb items may be received in the grinding cavity 32. The gripping grooves 35 may provide a better grip for the user.

After properly attaching the grinding handle 30, the user may then rotate the grinding handle 30 so that the grinding teeth 42 and the crushing teeth 44 may travel along the grinding grooves 241 and the grating sections 242 respectively for finely grinding the food or herb items in the grinding cavity 32. The grinded materials may then be guided by the grating member 20 to move toward the center portion thereof due to the concave contour of the grating platform 24. In addition, the grinded materials may be arranged to pass through the passage holes 21 and temporarily accommodate in the storage cavity 11. After the grinding process, the user may detach the grating member 20 from the storage base 10 and retrieve the grinded materials.

The present invention, while illustrated and described in terms of a preferred embodiment and several alternatives, is not limited to the particular description contained in this specification. Additional alternative or equivalent components could also be used to practice the present invention.

What is claimed is:

1. A grinding device for food or herb items, comprising:
   a storage base having a storage cavity;
   a grating member detachably coupled to the storage base to detachably enclose said storage cavity, said grating member having a plurality of passage holes arranged in a predetermined array;
   a grinding handle which is detachably and rotatably coupled to said grating member, and has an actuating portion and a grinding cavity, said grinding cavity being positioned to communicate with said storage cavity through said passage holes; and
   at least one grinding member which is provided in said grinding cavity, and comprises:
   a protruding body protruding in said grinding cavity and extending in a radial direction of said grinding handle; and
   a plurality of grinding teeth provided on said protruding body, said grinding teeth extending in a transverse direction of said protruding body, wherein when a predetermined amount of said food or herb items is disposed in said grinding cavity, and said grinding handle is driven to rotate with respect to said grating member, said grinding teeth are arranged to cut said food or herb items into fine pieces, said fine pieces of food or herb items being guided to pass through said passage holes and collected in said storage cavity.

2. The grinding device, as recited in claim 1, wherein each of said protruding body is downwardly protruded from said grinding handle toward said grating member, said protruding body having a curved contour in such a manner that when viewed from a bottom side of said grinding handle, a vertical thickness of said corresponding protruding body gradually decreases from a center portion toward two sides thereof.

3. The grinding device, as recited in claim 2, wherein said grinding teeth extends along an outer surface of said protruding body and along a transverse direction thereof, each of said grinding teeth having a vertex portion and two inclined portions extended from said vertex portion along two sides of said protruding body.

4. The grinding device, as recited in claim 3, wherein said grinding member further has a plurality of crushing teeth protruded from said corresponding protruding body at positions between each two grinding teeth.

5. The grinding device, as recited in claim 4, wherein said grinding handle further has a plurality of gripping grooves indently formed on said curved outer surface of said grinding handle.

6. The grinding device, as recited in claim 5, wherein said grinding handle further comprises a plurality of said grinding members, said all grinding members being structurally identical, and radially extending from a center portion of said grinding cavity, said grinding handle having a plurality of recesses each of which separating said two adjacent grinding members.

7. The grinding device, as recited in claim 1, wherein said grating member has an outer rim portion, a coupling portion extended from said outer rim portion, and a grating platform formed within said coupling portion, wherein said passage holes are formed on said grating platform, said coupling portion concentrically, inwardly, and upwardly extending from said outer rim portion to form a connecting groove as a clearance between said outer rim portion and said coupling portion for rotatably and detachably coupled to grinding handle.

8. The grinding device, as recited in claim 7, wherein said grating platform has a plurality of grinding grooves formed thereon to divide said grating platform into a corresponding number of grating sections, wherein each grinding groove is sandwiched between two corresponding adjacent grating sections, each grating section having a slightly convex cross sectional shape when viewed from side.

9. The grinding device, as recited in claim 8, wherein said grating platform is shaped to form a downward slope from said coupling rim portion and then an upward slope toward said center of said grating platform.

10. The grinding device, as recited in claim 6, wherein said storage base is configured from light admissible material and comprises a circumferential wall having a plurality of refraction ridges formed on an inner surface of said circumferential wall to divide said inner surface into a plurality of inner surface sections, said refraction ridges being arranged to alter an optical characteristic of said circumferential wall in such a manner that grinded materials stored in said storage cavity is optically magnified when observed from an exterior of said storage base.

11. The grinding device, as recited in claim 9, wherein said storage base is configured from light admissible material and comprises a circumferential wall having a plurality of refraction ridges formed on an inner surface of said circumferential wall to divide said inner surface into a plurality of inner surface sections, said refraction ridges being arranged to alter an optical characteristic of said circumferential wall in such a manner that grinded materials stored in said storage cavity is optically magnified when observed from an exterior of said storage base.

12. The grinding device, as recited in claim 10, wherein said storage base further comprises a plurality of engaging members inwardly protruded from said inner surface of said circumferential wall for detachably engaging with said grating member.

13. The grinding device, as recited in claim 11, wherein said storage base further comprises a plurality of engaging members inwardly protruded from said inner surface of said circumferential wall for detachably engaging with said grating member.

14. The grinding device, as recited in claim 13, wherein said grating member further comprises a plurality of coupling members extended from a bottom side of said outer rim portion for detachably engaging with said engaging member of said storage base.

15. The grinding device, as recited in claim 14, wherein each of said coupling members has a main extension portion and an engaging portion protruded from said main extension portion for interlocking with said corresponding engaging member of said storage base, said grating member being detachably and rotatably coupled to said storage base in such a manner that when said coupling members are rotated to correspond to said engaging members respectively, said engaging members are positioned to block an upward movement of said engaging portions of said coupling members.

16. The grinding device, as recited in claim 14, wherein said grinding handle further has an enclosure wall, said actuating portion having a curved outer surface wherein said grinding cavity is circumferentially bounded by said enclosure wall such that when said grinding handle is attached on said grating member, said enclosure wall is positioned at an outside of said coupling portion of said grating member and is partially received in said grinding groove.

17. The grinding device, as recited in claim 15, wherein said grinding handle further has an enclosure wall, said actuating portion having a curved outer surface wherein said grinding cavity is circumferentially bounded by said enclosure wall such that when said grinding handle is attached on said grating member, said enclosure wall is positioned at an outside of said coupling portion of said grating member and is partially received in said grinding groove.

18. The grinding device, as recited in claim 17, wherein said grinding teeth are positioned to correspond to said grinding grooves of said grating platform respectively while each of said crushing teeth is positioned on said corresponding grating section of said grating platform when said grinding handle is detachably and rotatably coupled on said grating member.

19. The grinding device, as recited in claim 18, further comprising at least a first magnetic member and a second magnetic member provided on said grinding handle and said grating member respectively for providing magnetic attraction force between said grinding handle and said grating member.

20. The grinding device, as recited in claim 19, wherein said grinding handle further has a securing slot formed on a center portion of a bottom side of said grinding handle, wherein said first magnetic member is accommodated in said securing slot, said grating member further comprising an accommodating housing extended from said grating platform, wherein said second magnetic member is accommodated in said accommodating housing, said accommodating housing being positioned corresponding to said securing slot so that when said grinding handle is detachably and rotatably coupled on said grating member, said accommodating housing is partially received in said securing slot so as to allow magnetic attraction between said first magnetic member and said second magnetic member.

\* \* \* \* \*